(12) United States Patent
Albers et al.

(10) Patent No.: US 7,684,018 B2
(45) Date of Patent: Mar. 23, 2010

(54) SENSOR DEVICE

(75) Inventors: Bas Albers, Chur (CH); Beat De Coi, Sargans (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 12/036,363

(22) Filed: Feb. 25, 2008

(65) Prior Publication Data

US 2008/0225263 A1 Sep. 18, 2008

Related U.S. Application Data

(63) Continuation of application No. PCT/EP2006/006284, filed on Jun. 29, 2006.

(30) Foreign Application Priority Data

Aug. 26, 2005 (DE) ............... 10 2005 040 763

(51) Int. Cl.
*G01C 3/08* (2006.01)
(52) U.S. Cl. ............... 356/5.01; 356/5.1; 356/5.15
(58) Field of Classification Search ............ 356/5.01
See application file for complete search history.

(56) References Cited

U.S. PATENT DOCUMENTS 5,898,401 A 4/1999 Walls 6,522,395 B1 * 2/2003 Bamji et al. ............... 356/5.01
2004/0183662 A1 * 9/2004 Baerenweiler et al. ...... 340/435

FOREIGN PATENT DOCUMENTS

EP 1 174 841 A1 1/2002
EP 1 562 055 A2 8/2005

* cited by examiner

*Primary Examiner*—Thomas H Tarcza
*Assistant Examiner*—Luke D Ratcliffe
(74) *Attorney, Agent, or Firm*—Burr & Brown

(57) ABSTRACT

A sensor device including a source for electromagnetic radiation, a receiver and a control device, the control device being designed for emitting electromagnetic radiation by means of the source and for determining a distance that is covered by the electromagnetic radiation emitted by the source from a reflection surface of an object to the receiver, doing so by evaluating a propagation time of the radiation or a phase of an oscillation modulated onto the radiation. According to the invention, the control device provides an economy mode in which the power of the source is lower in a prescribed time interval by comparison with a normal object detection mode, means being provided to ensure switching back into the normal object detection mode in the event of a predefined object situation.

14 Claims, 1 Drawing Sheet

SENSOR DEVICE

CROSS REFERENCE TO RELATED APPLICATIONS

This application is a continuation of International Application No. PCT/EP2006/006284, filed Jun. 29, 2006, and claims the benefit under 35 USC 119(a)-(d) of German Application No. 10 2005 040 763.3, filed Aug. 26, 2005, the entireties of which are incorporated herein by reference.

FIELD OF THE INVENTION

The invention relates to a sensor device comprising a source for electromagnetic radiation, a receiver and a control device.

BACKGROUND OF THE INVENTION

Embodiments of optical sensors have become known in which the distance from an object is determined optically using the time of flight (TOF) method. In this case, an oscillation is modulated onto light emitted from a light source. Moreover, a sensor is provided with which the modulated light be can be detected when it is retro reflected from a corresponding object surface. The distance from the object at which the light has been retro reflected can be determined from the phase difference of the oscillation modulated on between the emitted and the received reflected light. In order to enable an unambiguous evaluation, the wavelength of the oscillation modulated onto the light should be longer than twice the distance from the object at which the light is retro reflected.

Since objects to be detected are regularly poor reflectors, for example, asphalt, marble, human beings, clothing, hand luggage etc., that backscatter only a portion of the light and absorb another portion, only a comparatively small portion of the emitted modulated light returns to the receiver. Light sources of appropriate intensity must be used in order to obtain a light signal that can be evaluated.

Such light sources consist as a rule of LEDs or laser diodes. Since such components are comparatively expensive, it is advantageous to use as few of these components as possible. In order, nonetheless, to ensure a satisfactory light intensity, the components are regularly operated at their physical limits, and this limits the lifetime of the components.

It is known, furthermore, to undertake a distance measurement by evaluating the propagation time of an electromagnetic radiation.

SUMMARY OF THE INVENTION

It is the object of the invention to provide optical sensor devices with a comparatively long service life that enable a distance measurement by evaluating the propagation time or phase of light.

The invention proceeds from a sensor device that comprises a source for electromagnetic radiation, a receiver for the radiation and a control device, the control device being designed for emitting electromagnetic radiation by means of the source and for determining a distance that is covered by the electromagnetic radiation emitted by the source from a reflection surface of an object to the receiver, doing so by evaluating a propagation time of the electromagnetic radiation or a phase of an oscillation modulated onto the electromagnetic radiation.

The electromagnetic radiation preferably comprises light, in particular infrared light.

The essence of the invention resides in the fact that the control device provides an economy mode in which the power of the source is lower in a prescribed time interval by comparison with a normal object detection mode, means being provided to ensure switching back into the normal object detection mode in the event of a predefined object situation. A predefined object situation is, for example, the determination of an object movement, a door movement, that is to say an ambient change or simply the presence of an object. This mode of procedure is based on the finding that when the source for electromagnetic radiation is operated at high power with high radiation intensity at the limit of a maximum permissible temperature the service life of the source is reduced by comparison with operation in which the average temperature of the source is kept lower by operating at lower power. The limiting factor for the development of heat in the case of sources, in particular, light sources, is regularly the power fed to the source which, given a constant supply voltage, is proportional to a current through the source, for example a current on the semiconductor chip of a light emitting diode. The higher the current, the greater the development of heat, and thus the shorter the service life.

By specifically switching the source into an economy mode with lower power, preferably substantially lower power, than in the case in a normal object detection mode, it is possible to lengthen the service life of the source considerably. However, it must also be ensured that the source is switched back from the economy mode into a normal operational mode as soon as an object situation is present that necessitates the source to be fully functional.

On the other hand, it is preferred when the control device is configured in such a way that a switchover into the economy mode is made when it is not required by the object situation, for example when an object to be monitored, for example a door, is in a state that is not dangerous.

In a particularly preferred refinement of the invention, the sensor device is designed in such a way as to be able to detect objects or ambient changes, for example when a door opens, even in an economy mode.

For example, the recording frequency of the source is reduced. That is to say, fewer detections take place, for example image recordings per time unit. Consequently, it is still possible to detect a changing object situation in good time. As soon as such a situation is determined, it is possible to use the control device to switch over to a normal recording frequency of the source together with a corresponding increase in image recordings per time unit, for example.

It is also still possible to detect an object when the source operates in economy mode at a lower output power. For example, the current through a source is lowered, or it is made only of a portion of the source, for example a LED array. The lower output power of the source is certainly associated with a reduction in the measuring accuracy. However, the existing measuring accuracy can be defined such that it is still sufficient to "wake up" the sensor device, that is to say to transfer from the economy mode into a normal object detection mode.

If appropriate, it is also possible to implement longer radiation or exposure times for a measurement in order, given a comparatively lower radiation intensity or output power of the source, not to let the accuracy drop so far that it is no longer possible to detect objects, so as to be able to switch the sensor device from the economy mode into the normal object detection mode. In order to treat the source kindly, it is preferred in a further refinement that in the economy mode the source is operated at a reduced power or is switched off completely.

In order to achieve a reduction in the mean power of the source, it is advantageous in a further favorable refinement of the invention when the ontime of the source per measurement is reduced in the economy mode. It is true that the quality of the measurements is thereby reduced. However, it is possible to tolerate a drop in quality insofar as it is still possible to detect objects, in order to decide whether it is necessary to switch over into the normal object detection mode. In this case, the approach described further below is adopted that the sensor device brings itself into the economy mode and switches itself back into the normal object detection mode.

In a refinement of the invention it is preferred, furthermore, to configure the sensor device such that an external signal of a higher order controller can be processed in the economy mode in order to enable a function of object detection even in the economy mode.

The higher order controller could be, for example, a door controller, a time switch or a separate object detection unit that "wakes up" the sensor device in the economy mode such that said sensor device switches over from the economy mode into a normal object detection mode if an object situation arises that requires this. For such a functionality, the sensor device must have an input via which the external signal of the higher order controller can be led in.

It is, furthermore, advantageous when the control device is designed to switch itself into the economy mode. For example, the object situation is evaluated and a switchover into the economy mode is undertaken when external conditions are given for which there is no need to detect an object. If the sensor device is used as a door sensor, this can be performed as a function of the state of a door. Switching over into the economy mode is conceivable when the door is closed. In this case, the door cannot strike any other object, for example a person. It is likewise conceivable to switch over into the economy mode when the door is fully open and is not currently to be closed. That is to say, switching over into an economy mode is always sensible in cases where the door is stationary and does not immediately start to move.

To evaluate light, the receiver can, for example, be a camera chip, for example, a CCD or CMOS chip. An appropriate measurement in which surroundings are actively illuminated requires a light source to have a sufficiently high light intensity, which accelerates the ageing of the light source, for example the LEDs or a laser. In the economy mode, however, it is also possible to use an appropriate camera chip as in a commercially available camera in which it is normally only existing ambient light that is used to generate an item of image information. Thus, images can be recorded without active illumination. These images or a variation in the image information can be used in order to switch the sensor device from the economy mode, in which an active illumination is entirely lacking, into the normal image acquisition mode in which, for example, a light source is active.

It is thereby possible in a preferred refinement for the source, in particular light source, to be switched off completely in the economy mode.

If the sensor is, for example, particularly insensitive to ambient light, which is also desired in the object detection mode, it is possible to use illumination. However, since, in particular, importance is given in this mode not to a component modulated on, but to the direct component of the light, it is possible to operate with a reduced power of a light source.

Reducing the power of the source, in particular light source, has decisive advantages for the service life of the source, but it is also necessary to consider operational circumstances of the source associated therewith.

The efficiency, that is to say the radiation intensity of sources normally suitable such as, for example, light sources in the form of LEDs or laser diodes improves the cooler the component is. However, this also means that when a reduction in the power of the source is undertaken in the economy mode a higher light intensity is to be expected upon returning to the normal object detection mode, and this can "overexpose" the receiver. The point is that the economy mode causes a drop in the mean temperature of the light source, and this leads to a higher light intensity. The radiation/exposure and/or integration time of the receiver can be reduced in order to avoid "overexposing" the receiver. It is thereby possible to avoid overloaded receiver information with poor quality. Moreover, the electronics is usually sensitive to temperature fluctuations, and this can, for example, cause the frequency of the modulation of the electromagnetic radiation, and thus the measured distance to change.

In order to avoid "overexposing" the receiver when a switchover into the economy mode has taken place, it is possible to adapt the "radiation/exposure time or integration time" of the receiver in a way dependent on for how long "economy mode" has been assumed. It is likewise conceivable to detect the temperature of the source in order to be able to prescribe a radiation/exposure and/or integration time of the receiver that is adapted thereto. The temperature can be determined with the aid of the voltage and/or the current through one or more LEDs. It is also possible to carry out measurements in the economy mode from time to time in order to check whether the "exposure time" is still suitable. Preset values for the radiation/exposure time and/or the integration time can be tracked as a function of the result, of this evaluation.

It is further possible when switching back into the object detection mode firstly to bring the source up to a suitable temperature by sending more current per time unit through the source. As has been said, it is also a problem when the electronics cool down too strongly, because the modulation of the electromagnetic radiation can then change, for example. In order to oppose this, it is likewise conceivable to keep the sensor device, in particular the control device or a part thereof, at a constant temperature by having the equipment comprise a heat source. This can be done, for example, by means of appropriate resistors. A constant temperature can, however, also be achieved by cooling appropriate modules of the sensor device.

In order to avoid temperature influences, temperature sensitive parts of the sensor device can also be thermally separated from the radiation source, in particular illumination. For example, a reference oscillator can be thermally insulated in order to avoid temperature induced fluctuations of the oscillator.

A receiver with a pixel array is fundamentally preferred for the sensor device. However, it is also possible to use a simple light detector, with, as it were, a pixel that is fully sufficient for undertaking a distance measurement.

BRIEF DESCRIPTION OF THE DRAWINGS

Two exemplary embodiments of the invention are illustrated in the figures and explained below with specifications of further details.

DETAILED DESCRIPTION OF THE INVENTION

Figure 1:
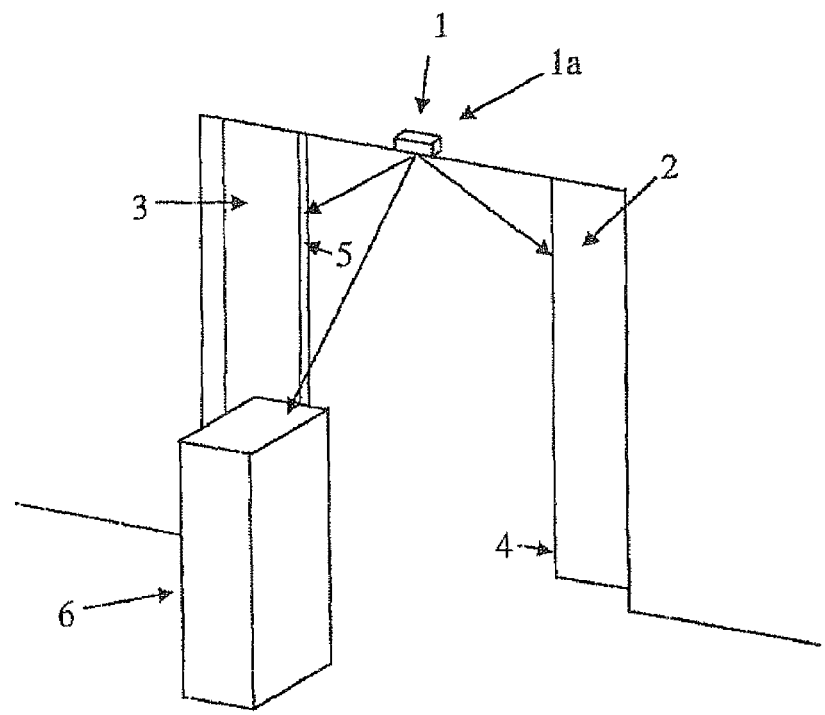
FIG. 1 shows a schematic three dimensional illustration of an optical door sensor arrangement on a two-leaf sliding door with an object moving toward the door.

FIG. 1 shows an optical door sensor arrangement 1 on a two-leaf sliding door with an optical sensor 1a above the two door leaves. The door leaves 2, 3 are partially open and about to close. An object 6, for example a person, is moving toward the door leaves 2, 3.

The door sensor arrangement 1 detects the distance from the object 6 and, in particular, to the front edges 4, 5 of the door leaves 2, 3. Particular interest is accorded the distance of the object 6 from the front edges 4, 5 of the door leaves, in order to decide whether the closing operation is to be stopped, if appropriate.

This can be the case when the object 6 approaches the doors 2, 3 so close that a collision with the doors cannot be excluded.

The door sensor arrangement 1 operates according to the above described time of flight principle. In order to be able to undertake detection of the distances from the object 6 and the door front edges 4, 5, a light source emits light with a comparatively high intensity that is evaluated after being retro reflected to the door sensor arrangement 1.

If it is now determined that the object 6 has moved toward the door leaves 2, 3, but has then remained in this position in front of the door leaves 2, 3, and that the door leaves 2, 3 could therefore be fully closed, there is no longer a need for the door sensor arrangement 1 to determine the distance from the object 6 at full quality. Rather, it already suffices to know whether the object is continuing to stand still or has begun to move. However, this does not require the distance detection functionality of the door sensor arrangement 1.

According to the invention, in this state the door sensor arrangement 1 is transferred to an economy mode in which the light source is preferably switched off completely. A CCD chip integrated in the door sensor arrangement 1, however, continues to capture the space in front of the doors 2, 3, and decides merely from the evaluation of the camera image whether the object 6 has moved or continues to be stationary. As soon as a movement of the object 6 is detected, it is possible to undertake a switchover into the conventional object detection mode with high accuracy with regard to a distance measurement.

Figure 2:
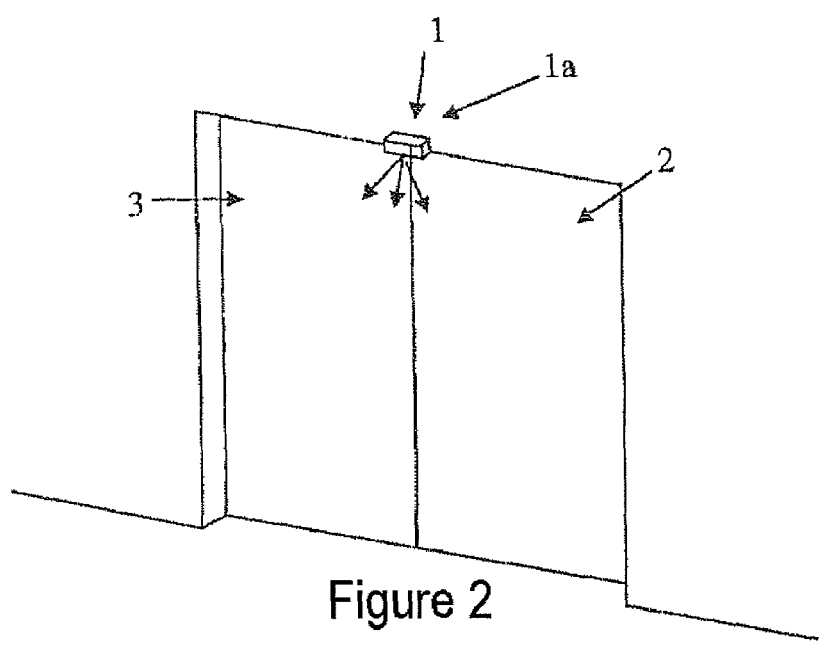
FIG. 2 shows a schematic three dimensional illustration of a closed two-leaf sliding door with an optical sensor arrangement.

FIG. 2 shows a second design variant. Here, the door is closed and the sensor is in the economy mode. The illumination is operated with reduced current, and is therefore relatively weak. Since, however, the upper edge of the door is located very near the sensor, it is still possible during reduced illumination to determine whether the door is closed or not. As soon as the door opens, this is detected by the sensor, the latter switches into normal operation.

What is claimed is:

1. A door sensor that senses the proximate position of a movable door and determines the position of any objects relative to the movable door, said door sensor comprising a source for electromagnetic radiation, a receiver for the electromagnetic radiation, and a control device, the control device being designed for emitting electromagnetic radiation by means of the source and for determining a distance that is covered by the electromagnetic radiation emitted by the source from a reflection surface of an object to the receiver, doing so by evaluating a propagation time of the electromagnetic radiation or a phase of an oscillation modulated onto the electromagnetic radiation, the control device providing an economy mode in which the power of the source is lower in a prescribed time interval by comparison with a normal object detection mode, means being provided to ensure switching back into the normal object detection mode in the event of a predefined object situation, wherein the control device prescribes the economy mode when the door is closed.

2. The sensor device as claimed in claim 1, wherein the sensor device is designed so as to detect objects or ambient changes even in the economy mode.

3. The sensor device as claimed in claim 1, wherein the control device is fashioned to be able to process an external signal of a higher-order controller in the economy mode in order to enable the function of an object detection even in the economy mode.

4. The sensor device as claimed in claim 1, wherein the control device is designed to switch itself into the economy mode.

5. The sensor device as claimed in claim 1, wherein the control device includes a signal input that can prescribe a switchover into the economy mode.

6. The sensor device as claimed in claim 1, wherein a measurement frequency of the source is reduced in the economy mode.

7. The sensor device as claimed in claim 1, wherein the source operates at a lower power in the economy mode.

8. The sensor device as claimed in claim 1, wherein the source is switched off in the economy mode.

9. The sensor device as claimed in claim 1, wherein, in the economy mode, an ontime of the source per measurement is lowered.

10. The sensor device as claimed in claim 1, wherein the control device takes account of temperature induced intensity changes of the source by adapting the radiation time of the source for a measurement.

11. The sensor device as claimed in claim 1, wherein the control device takes account of temperature induced intensity changes of the source by adapting the radiation time and/or an integration time of the receiver during a measurement.

12. The sensor device as claimed in claim 1, wherein temperature regulation means are provided in order to regulate the temperature of at least individual components of the sensor device.

13. A door sensor device for sensing the position of an object relative to a movable door, wherein the operation mode is determined by the movement and position of said door comprising a source for electromagnetic radiation, a receiver for the electromagnetic radiation, and a control device, the control device being designed for emitting electromagnetic radiation by means of the source and for determining a distance that is covered by the electromagnetic radiation emitted by the source from a reflection surface of the object to the receiver, doing so by evaluating a propagation time of the electromagnetic radiation or a phase of an oscillation modulated onto the electromagnetic radiation, the control device providing an economy mode in which the power of the source is lower in a prescribed time interval by comparison with a normal object detection mode, means being provided to ensure switching back into the normal object detection mode so that the object is detected proximate to said door, wherein the control device prescribes the economy mode when said door is stationary and at least one of the following situations is present: (1) said door is not about to move and is fully closed; and (2) said door is not about to move and is fully open.

14. A door sensor that senses the proximate position of a movable door and determines the position of any objects relative to the movable door, said door sensor comprising a source for electromagnetic radiation, a receiver for the electromagnetic radiation, and a control device, the control device being designed for emitting electromagnetic radiation by means of the source and for determining a distance that is covered by the electromagnetic radiation emitted by the source from a reflection surface of an object to the receiver, doing so by evaluating a propagation time of the electromagnetic radiation or a phase of an oscillation modulated onto the electromagnetic radiation, the control device providing an economy mode in which the power of the source is lower in a prescribed time interval by comparison with a normal object detection mode, means being provided to ensure switching back into the normal object detection mode in the event of a predefined object situation, wherein the control device prescribes the economy mode when the door is closed, and, due to the close proximity of the door sensor to the movable door, prescribes the normal object detection mode to sense said objects when the movable door begins to move.

* * * * *